B. MELLINGER.
Horse Hay-Rakes.

No. 160,693. Patented March 9, 1875.

WITNESSES:
W. W. Hollingsworth
Solon O. Kernow

INVENTOR:
Benj. Mellinger
BY
ATTORNEYS.

UNITED STATES PATENT OFFICE.

BENJAMIN MELLINGER, OF MOUNT PLEASANT, PENNSYLVANIA.

IMPROVEMENT IN HORSE HAY-RAKES.

Specification forming part of Letters Patent No. 160,693, dated March 9, 1875; application filed December 16, 1874.

*To all whom it may concern:*

Be it known that I, BENJAMIN MELLINGER, of Mount Pleasant, in the county of Westmoreland and State of Pennsylvania, have invented a new and Improved Horse Hay-Rake; and I do hereby declare that the following is a full, clear, and exact description of the same, reference being had to the accompanying drawing forming a part of this specification, in which—

Figure 1:
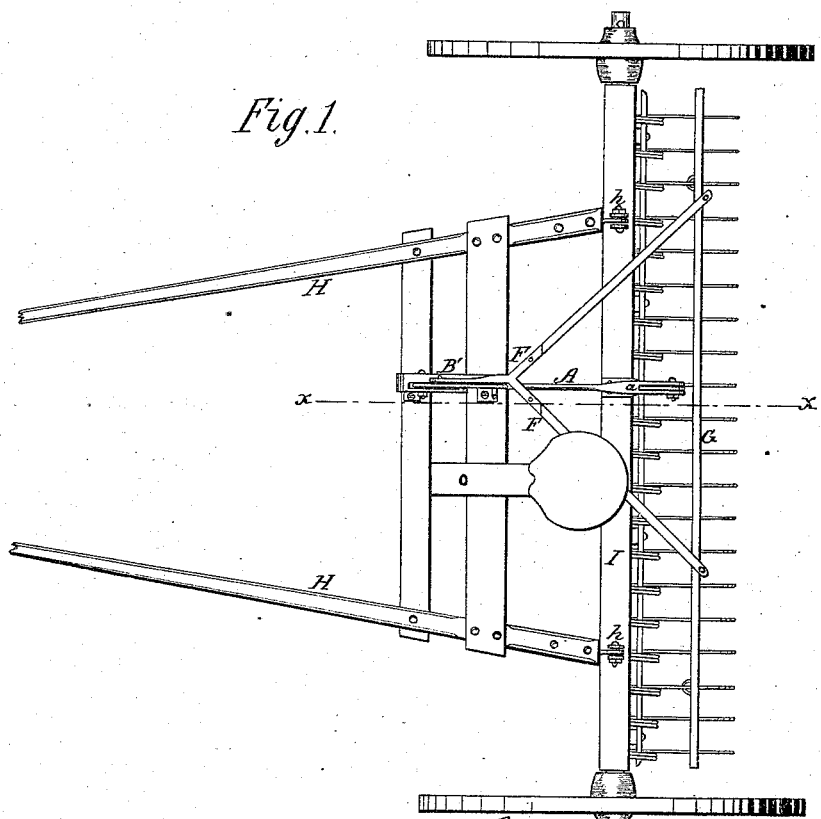
Figure 2:
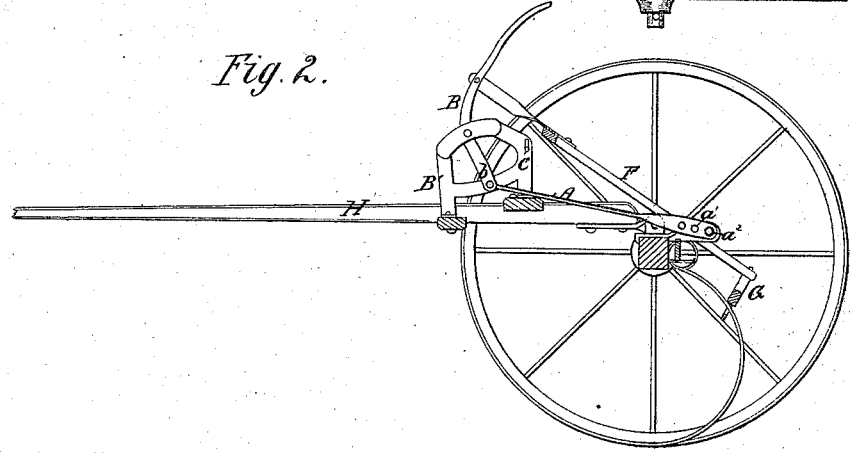

Figure 1 is a plan view, and Fig. 2 a sectional elevation.

The invention relates to means by which horse-rakes and their teeth-cleaning devices may be more readily and securely held in position, as well as more easily worked by the driver. These novel means will first be fully described, in connection with all that is necessary to a full understanding thereof, and then pointed out in the claim.

A represents the rod that is connected with the axle for raising the rake. The lever B is placed on a frame, B', through which it is operated by the driver from his seat. This frame is used by me for the purpose of raising the lever-fulcrum, so that the rake-head and clearer may be readily operated by the same toggle-joint. C is a downwardly-bent hook, which receives the rod just behind the lever end $b$, that abuts against the hook. By this device the rake is held firmly in position until it is the pleasure of the driver to change it. I make the rod A bifurcated at the end $a$, and provide this end with a series of transverse holes, $a^1$, so that by moving and fastening the end of rod, by a cross-pin, $a^2$, in different holes, I can throw the rake farther under the axle, nearer to the ground, and so as to rake more or less closely. I also connect the rake-clearer G, by a bibranched rod, F, to the lever B, pivoting it above the lever's fulcrum, so that, whenever the lever is actuated for raising the rake, the rod F will receive some of the actuating force, and thus cause the teeth-cleaner to do its work with more certainty and efficiency than is now customary. In order that the draft or horse-power shall contribute to the lifting of the rake, I hinge the thills H to little standards $h$ $h$ on top of the axle I, so that as soon as the axle mechanism A B is relieved from the lock-hook C, the pulling of the horse will tend to turn the axle in the wheels, which run loosely on its journals.

Having thus described my invention, what I claim as new is—

The devices for operating the rake, consisting of the frame B', having stop-hook C, bent lever B, connecting-rod A, bifurcated at the end, and provided with adjusting-holes $a'$, the branched rods F, and cleaner G, all combined and arranged substantially as and for the purpose described.

BENJ. MELLINGER.

Witnesses:
JOHN WEITZEL,
LAURENCE MELLINGER.